United States Patent [19]

Hen

[11] Patent Number: 5,604,185
[45] Date of Patent: Feb. 18, 1997

[54] INHIBITION OF SCALE FROM OIL WELL BRINES UTILIZING A SLOW RELEASE COMPOSITION AND A PREFLUSH AND/OR AFTER FLUSH

[75] Inventor: John Hen, Skillman, N.J.

[73] Assignee: Mobil Oil Corporation, Fairfax, Va.

[21] Appl. No.: 411,172

[22] Filed: Mar. 27, 1995

[51] Int. Cl.$^6$ ............... E21B 43/25; C23F 11/12; C23F 11/14; C23F 11/167
[52] U.S. Cl. ............................. 507/119; 507/224
[58] Field of Search ................... 507/119, 224; 252/8.522

[56] References Cited

U.S. PATENT DOCUMENTS

| | | | |
|---|---|---|---|
| 3,827,977 | 8/1974 | Miles | 252/8.55 B |
| 4,602,683 | 7/1986 | Meyers | 166/279 |
| 5,141,655 | 8/1992 | Hen | 252/8.552 |
| 5,339,270 | 3/1995 | Hen | 507/224 |
| 5,346,010 | 9/1994 | Adams et al. | 166/279 |

*Primary Examiner*—David B. Springer
*Attorney, Agent, or Firm*—Malcolm D. Keen

[57] ABSTRACT

An improvement in a method for the inhibition of scale deposition on the surfaces of a well coproducing oil and scale forming brines, said method comprising injecting into the well reservoir an acidic aqueous solution at a first pH containing dissolved therein a scale inhibitor, multivalent metal cations, and a heat-sensitive pH-increasing substance which decomposes at elevated temperatures liberating an alkaline compound such that the solution is inherently heated by the higher ambient reservoir temperature to a temperature at which the alkaline compound is liberated from the heat-sensitive substance thus raising the pH of the solution to a point at which a sparingly soluble multivalent metal salt of the scale inhibitor is phase separated from the solution on the porous surfaces of the reservoir rock formation, providing for a slow release of inhibitor into the produced brines when the well is in its production phase. Such improvement comprises injecting as a preflush before said injection of inhibitor solution and/or as an afterflush after said injection of inhibitor solution, a solution of a heat sensitive pH-increasing substance and multivalent metal cations.

20 Claims, No Drawings

INHIBITION OF SCALE FROM OIL WELL BRINES UTILIZING A SLOW RELEASE COMPOSITION AND A PREFLUSH AND/OR AFTER FLUSH

CROSS-REFERENCE TO RELATED APPLICATION

This application is related to application Ser. No. 07/925,134, filed Aug. 6, 1992, now U.S. Pat. No. 5,399,270.

BACKGROUND OF THE INVENTION

1. Field of the Invention

This invention relates to the inhibition of scale formation from oil well brines utilizing a slow release inhibitor composition.

2. Background Information Including Description of Related Art

In the production of crude oil from underground wells, mineral scales such as barium sulfate, strontium sulfate, calcium sulfate and calcium carbonate are often formed on wellbore and equipment surfaces where oil and water containing dissolved salts are coproduced. The formation of scale can slow oil production rate and, at the extreme, stop production completely. An expedient often utilized is to inject or "squeeze" a solution of a scale inhibitor such as a polyphosphonate or a polyacrylic acid into the reservoir rock, often utilizing a brine or water afterflush, and allow the absorbed inhibitor to desorb during fluids production. In practice, however, the desorption process is often found to be quite rapid once production is resumed necessitating frequent shutdowns for additional treatments. This has the effect of substantially reducing the productivity of the well.

Various improvements in the adsorption and desorption of scale inhibitors have been proposed, some of which are disclosed in the following prior art references.

U.S. Pat. No. 3,827,977, issued Aug. 6, 1974 to Miles et al. discloses the in situ deposition in the porous rock formation adjacent to a well bore of a polyvalent metal salt of a polyacrylic acid or partially hydrolyzed polyacrylamide inhibitor by introducing into the porous formation a strongly acidic aqueous solution of a salt of the inhibitor and the polyvalent metal. The acid is partially neutralized by the reservoir liquid causing the polyvalent salt of the inhibitor to phase separate on the porous surfaces.

U.S. Pat. No. 4,602,683, issued Jul. 29, 1986 to Meyers, discloses the inhibition of scale deposition during the operation of an oil well by injecting an inhibitor solution into a subsurface brine producing formation at a higher first pH, and thereafter subjecting the solution to a fluid or substance which reduces the higher first pH to a lower second pH causing precipitation of the scale inhibitor in the formation. Alternatively, the scale inhibitor may be precipitated by injecting a second solution having a pH lower than the second pH into the formation or a substance that lowers the pH of the inhibitor solution to the second pH.

U.S. Pat. No. 5,141,655 issued Aug. 25, 1992 to Hen, discloses a method for the injection of scale inhibitor into reservoir rock which alleviates the problem of too rapid desorption of inhibitor during production, such method comprising injecting into a well reservoir an aqueous acid solution containing a scale inhibitor, multivalent metal ions, and a heat-sensitive substance which decomposes at the temperature of the reservoir liberating an alkaline compound, thus raising the pH of the solution and causing a multivalent metal salt of the scale inhibitor to phase separate out onto the surfaces of reservoir rock formation.

U.S. Pat. No. 5,346,010, issued Sep. 13, 1994 to Adams et al., discloses a process similar to that disclosed in the preceding paragraph, but wherein the inhibitor injection solution also contains a chelating agent for the purpose of preventing iron ions from causing premature hydrolysis of the base generating precursor. The disclosure of this patent also states that an "overflush" may be employed which may contain an additional quantity of the precursor.

SUMMARY OF THE INVENTION

In accordance with the invention, a method is provided for the inhibition of scale deposition on the surfaces of a well coproducing oil and scale forming brines which is an improvement over the previously known method disclosed in U.S. Pat. No. 5,141,655, the latter method comprising injecting into the well reservoir an acidic aqueous composition at a first pH containing dissolved therein a scale inhibitor and multivalent metal cations, and also containing dissolved or emulsified therein a heat-sensitive pH-increasing substance which decomposes at elevated temperatures liberating an alkaline compound, e.g. ammonia or an amine. The composition is then inherently heated by the higher ambient reservoir temperature to a temperature at which the alkaline compound is liberated from the heat-sensitive substance raising the pH of the composition to a point at which a sparingly soluble multivalent metal salt of the scale inhibitor is phase separated from solution on the surfaces of the reservoir rock formation, providing for a slow release or desorption of inhibitor into the produced brines when the well is in its production phase.

Unlike the case with some of the prior art methods described previously, the foregoing previously known method provides for the efficient placement of a sparingly soluble scale inhibitor in the well reservoir capable of slowly releasing inhibitor into the produced brines, without the requirement for efficient mixing with such brines, which is difficult to satisfy in some sandstone formations. Furthermore, the method greatly enhances the retention of scale inhibitor while keeping to a minimum damage of the reservoir rock which could be caused by excessive precipitation of multivalent metal salt of inhibitor on the porous reservoir surfaces. It has been found, however, that when the injected scale inhibitor solution is subjected to a brine afterflush for the purpose of obtaining phase separation of the sparingly soluble multivalent metal salt of the scale inhibitor onto the reservoir rock surfaces, the dilution of the injected composition causes a reduction in the amount of multivalent metal salt of the scale inhibitor which is phase separated. This is undesirable since the life of the injection treatment increases with the degree of phase separation.

The improvement of the foregoing previously known process made under this invention comprises injecting into the reservoir as a "preflush," i.e., before the scale inhibitor solution is injected, or an "afterflush," i.e., after the scale inhibitor solution is injected, or both as said preflush and afterflush, a solution containing amounts of heat-sensitive pH increasing substance and multivalent metal cations in addition to the amounts of these types of substances present in the scale inhibitor solution. It has been found that such preflush and/or afterflush increases the phase separation of the sparingly soluble multivalent metal salt of the scale inhibitor and thus the life of the scale inhibitor injection treatment to an unexpectedly high degree.

DESCRIPTION OF PREFERRED EMBODIMENTS

The scale inhibitors contemplated under this invention contain a multiplicity of reactive groups, for example, carboxylate and/or phosphonate, which are capable of interacting with the polyvalent metal ions in the produced brines to prevent or minimize the deposition of scale on reservoir, wellbore, and equipment surfaces. The inhibitor, may be, for example, a polycarboxylate, e.g., a polymeric polycarboxylate such as a homopolymer or copolymer (composed of two or more co-monomers) of an alpha, beta-ethylenically unsaturated acid monomer such as acrylic acid, methacrylic acid, a diacid such as maleic acid (or maleic anhydride), itaconic acid, fumaric acid, mesoconic acid, citraconic acid and the like, monoesters of diacids with alkanols, e.g., having 1–8 carbon atoms, and mixtures thereof. When the inhibitor is a copolymer, the other component monomer may be any alpha, beta-ethylenically unsaturated monomer with either a non-polar group such as styrene or olefinic monomers, or a polar functional group such as vinyl acetate, vinyl chloride, vinyl alcohol, alkyl acrylates, vinyl pyridine, vinyl pyrrolidone, acrylamide or acrylamide derivatives, etc., or with an ionic functional group such as styrenesulfonic acid, 2-acrylamido-2-methylpropanesulfonic acid (AMPS), vinylsulfonic acid, or vinylphosphonic acid. Certain of the foregoing copolymers may be prepared by aftertreating a homopolymer or a different copolymer, e.g., copolymers of acrylic acid and acrylamide by partially hydrolyzing a polyacrylamide. The contemplated polymeric polycarboxylate inhibitors also include the foregoing homopolymers and copolymers chemically modified to include other functional groups contributing to their performance, e.g., the phosphino-polyacrylic acids disclosed in U.S. Pat. No. 4,105,551 and sold under the trademark "Belsperse 161" or "Belasol S-40" by FMC. The molecular weight range of the polymeric polycarboxylate inhibitor utilized in this invention may be, for example, from about 500 to 10,000.

Also suitable as the scale inhibitor of this invention are the monomeric and polymeric phosphonates, e.g., aminomethylenephosphonates such as aminotri(methylenephosphonic acid), ethylenediaminetetra(methylenephosphonic acid), hexamethylenediaminetetra(methylenephosphonic acid), diethylenetriaminepenta(methylenephosphonic acid), and N,N'-bis(3-aminopropyl)ethylenediaminehexa(methylenephosphonic acid), commercially available from Monsanto Corp. as "Dequest 2086", 1-hydroxyethylidene-1,1-diphosphonic acid, and homopolymers and copolymers of vinylphosphonate.

Another class of inhibitors which may be used in practicing the method of this invention are organic phosphate esters such as phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine. Some examples of this class of inhibitors are disclosed in Jack C. Cowan and Donald J. Weintritt, *Water -Formed Scale Deposits*, (Houston: Gulf Publishing Co., 1976), 284 and 285.

The inhibitor may be present in the injected inhibitor solution in an amount, for example, in the range of about 0.25 to 15 wt. % preferably about 0.5 to 5 wt. % based on the total weight of the solution.

The multivalent metal cations utilized in the scale inhibitor solution and in the preflush and/or afterflush flush solutions are those capable of forming sparingly soluble salts of the scale inhibitor at a pH higher than that of the initial injected solution. Some multivalent metal ions which can be used are, for examples, alkaline earth metal cations, particularly calcium and magnesium, aluminum (+3), chromium (+3), iron (+3), titanium (+3), zirconium (+4), zinc (+2), and copper (+2). The preferred multivalent metal cations are calcium and magnesium. The cations are utilized in the form of a water-soluble salt, preferably containing an anion which does not contribute to scale formation, e.g., chloride or nitrate. The amount of dissolved multivalent metal cations employed in the scale inhibitor solution is in the range, for example, of about 0.05 to 5.0, preferably about 0.20 to 2.50 equivalents per equivalent of inhibitor, while in the preflush or after flush solutions, the multivalent metal cations may be present in an amount, for example of about 0.002 to 2.0 wt. %, preferably about 0.002 to 1.0 wt. % based on the weight of the solution.

The heat-sensitive, pH-increasing compound utilized in the scale inhibitor solution and in the preflush and/or afterflush solutions may be, for example, urea or a urea derivative, having the formula:

$$R^1R^2NCONR^3R^4$$

where the R's are the same or different and each may be, for example, hydrogen, an alkyl group containing 1 to 8 carbon atoms or an aromatic group, e.g., phenyl or tolyl consistent with a total number of carbon atoms no greater than 10. Compounds which may be employed are, for example, urea, 1-methylurea, 1,1-dimethylurea, 1,3-dimethylurea, 1,1,3-trimethylurea, 1-ethylurea, 1,1-diethylurea, 1,3-diethylurea, n-propylurea, n-butylurea, 1-phenylurea, 1-methyl-3-phenylurea and 1-ethyl-1-phenylurea.

When urea or any of the contemplated urea derivatives are heated to an elevated temperature, e.g., at least about 40° C. such as occurs in the reservoirs of producing wells, they liberate ammonia and/or amine in accordance with the following equation.

$$R^1R^2NCONR^3R^4 + H_2O \xrightarrow{\Delta} NHR^1R^2 + NHR^3R^4 + CO_2$$

The liberated ammonia or amine is a basic substance which acts to increase the pH of the injected solution to a level at which a sparingly soluble multivalent metal salt of the inhibitor phase separates and slowly releases inhibitor into the reservoir during production thus minimizing scale deposition. The $CO_2$ liberated may or may not dissolve in the brine depending on the reservoir conditions. In any case there is a two to one molar ratio of amine to $CO_2$ liberated.

Another group of heat-sensitive pH-increasing compounds which may be used are organic azides containing the group —N=N=N. For example acyl azides having the formula RCON=N=N, on being heated to above about 80° C., tend to rearrange to the isocyanate R—N=C=O with the liberation of nitrogen ($N_2$); the isocyanate then reacts with water to yield the amine and $CO_2$ in accordance with the following equation:

$$R-N=C=O + H_2O \xrightarrow{\Delta} RNH_2 + CO_2$$

Since one mole of $CO_2$ is released with each mole of amine, acyl azides are useful in the special case where the produced water is fully saturated with native $CO_2$ under reservoir conditions, and the $CO_2$ liberated from the reaction goes into the oil phase. Under these conditions, the amine has the effect of increasing the pH of the inhibitor solution providing for the phase separation and subsequent slow release of the multivalent metal salt of the inhibitor, as described previously in connection with the use of urea or a urea derivative as the heat-sensitive substance.

Azides which may be used are, for example, acetyl azide, propionyl azide, malonyl azide, succinyl azide, phthaloyl azide and other acyl diazides.

Other heat-sensitive base releasing materials which may be used are, for example, cyanic acid, and amines which have been previously sorbed into activated carbon or a similar sorption matrix.

A group of heat-sensitive, pH-increasing compounds which decompose at relatively low temperatures and are therefore particularly useful for the treatment of low temperature oil well reservoirs, are the tetraazatricycloalkanes such as hexamethylenetetramine (HMTA); 1,2,5,7-tetraazatricyclo-[3.3.1.1.$^{3,7}$] decane; 1,4,6,9-tetraazatricyclo-[7.1.1.1.$^{4,7}$] dodecane; and 1,3,6,8-tetraazatricyclo-[4.4.1.1.$^{3,8}$] dodecane. In general, members of this class of heat-sensitive substances may be employed in reservoirs at a temperature of about 20° to 85° C. preferably about 40° to 60° C.

The heat-sensitive pH-increasing substance is present in the scale inhibitor solution and in the preflush and/or afterflush flush solutions in an amount sufficient to raise the pH in the reservoir sufficiently to effect the phase separation on the porous surfaces of the reservoir of all or part of the inhibitor as its sparingly soluble multivalent metal salt, such that an adequate amount of inhibitor is fed into the well formation during the production phase of the well to significantly inhibit scale deposition. In many cases, the heat-sensitive pH-increasing substance will be utilized in the original inhibitor solution to be injected in an amount of about 0.01 to 5.0 wt. %, preferably about 0.05 to 3.0 wt. % based on the weight of the solution, while in the preflush and/or afterflush solutions, the heat-sensitive, pH-increasing substance will generally be present in an amount of, for example, about 0.002 to 5.0 wt. %, preferably about 0.02 to 3.0 wt. % based on the weight of the solution. The process is such that sufficient sparingly soluble multivalent salt of inhibitor is deposited on the surfaces of the well formation to maintain the concentration of inhibitor in the produced brine in the range of about 0.05 to 50 ppm, preferably about 0.5 to 10 ppm during the life of the injection treatment.

In order to prevent phase separation or precipitation of the multivalent salt of the inhibitor in the inhibitor solution to be injected, such solution must have an initial pH in the acidic range, e.g., about 1.0 to 6.0, preferably 1.5 to 4.5. Such acidity may be obtained at least partially by the use of an acidic inhibitor. However, if the inhibitor is not sufficient for the purpose, additional acidity of the initial solution may be obtained by the addition of a strong acid, e.g., hydrochloric or nitric acid, or a combination of strong and weak acids. Sulfuric acid is generally not used for this purpose since sulfate ions can contribute significantly to scale deposition.

The specific multivalent metal cations and heat-sensitive pH-increasing substance utilized in the preflush and/or afterflush solutions may be the same or different from the specific substances of these categories utilized in the inhibitor solution. Furthermore, the concentrations of these substances in the preflush and/or afterflush solutions, while generally within the foregoing ranges, may also be the same or different from the concentrations employed in the inhibitor solution. The amount of preflush and/or afterflush utilized should be sufficient to significantly minimize the reduction of phase separation of the inhibitor on the reservoir rock surfaces and therefore the life of the injection treatment, caused by the dilution of the injected inhibitor solution by produced aqueous liquids within the well. In many cases, the volume of preflush and/or afterflush solution will be in the range, for example, of about 0.05 to 5.0 volumes, preferably about 0.10 to 3.0 volumes per volume of injected inhibitor solution.

Substantially any source of water may be used as the aqueous solvent in the preparation of the inhibitor solution and the preflush and/or afterflush solution to be injected, e.g., sea water or inland surface or underground waters. However, the nature of the initial aqueous solvent utilized in these solutions could effect the quantity and possibly the nature of the added inhibitor solution components to obtain the optimum properties of the solution in carrying out the inventive process.

In addition to the components described hereinbefore, the inhibitor solution and preflush and/or afterflush solutions may contain other components having functions well-known in the art. For example, the preflush and/or afterflush solution may contain a small amount of scale inhibitor i.e., in a concentration substantially less than that in the main inhibitor solution, e.g., a concentration no higher than about 20 wt. % of that in such inhibitor solution. In many cases however, the preflush and/or afterflush solution will not contain any scale inhibitor.

The inhibitor solution and the preflush and/or afterflush solutions are injected or squeezed into the reservoir formation using techniques well-known in the art. In general, the benefits of the process will be obtained if the temperature within the reservoir formation is, for example, in the range of about 20 to 200, preferably about 40° to 150° C.

The invention is further illustrated by the following examples. In Examples 1 to 5, the scale inhibitor was a phosphino-polyacrylic acid (PPA), produced as shown in U.S. Pat. No. 4,105,551 and sold by FMC under the trademark "Belasol S40", and having an average molecular weight of 3000–4000, a specific gravity of 1.2, a pH neat of less than 4.1, and a phosphorous content (as P) of 0.86%; the multivalent metal cations were calcium added as calcium chloride; and the heat-sensitive pH-increasing substance was urea. In all the examples, the simulated sea water utilized as the aqueous solvent medium had the following composition:

TABLE 1

| Components | Concentration, grams/liter |
| --- | --- |
| $MgCl_2$ $6H_2O$ | 11.70 |
| $CaCl_2$ $2H_2O$ | 1.47 |
| KCl | 0.70 |
| $NaHCO_3$ | 0.20 |
| $Na_2SO_4$ | 3.92 |
| NaCl | 25.10 |
| de-ionized $H_2O$ to 1 liter | |

EXAMPLE 1

This example illustrates the effect of dilution with sea water on the phase separation of a long life scale inhibitor composition contemplated under the invention. The inhibitor composition was prepared containing 3.5 wt. % PPA, 0.61 wt. % calcium ions and 0.8 wt. % urea in sea water at an initial pH of 3.2. The composition was either not diluted so that the dilution ratio, i.e. the ratio of the volume of solution before dilution to that after dilution, was 1 to 1, or the composition was diluted with sea water to obtain dilution ratios of 1 to 2, 1 to 4, 1 to 8 and 1 to 11 to simulate dispersion during field application. The five samples were placed in a sealed Wheaton clear borosilicate bottle and aged in a 100° C. air-circulating oven for 24 hours. Measurements performed on the samples include: time in hours to initial haze (onset of phase separation), final pH of the supernatant after 24 hours of aging, and the degree of phase separation at 24 hrs (defined as the percent of total inhibitor which phase separated). The results as shown in Table 2 indicates that dilution causes a progressive decrease in phase separation from 71% with no dilution to 26% at a 1 to 11 dilution. The pH of the supernatant in all five samples increased as a consequence of the liberation of base by the thermal decomposition of urea.

TABLE 2

| Sample | 1A | 1B | 1C | 1D | 1E |
| --- | --- | --- | --- | --- | --- |
| Dilution ratio | 1 to 1 | 1 to 2 | 1 to 4 | 1 to 8 | 1 to 11 |
| Hours to initial haze | 2.5 | 3.45 | 4.75 | 5.63 | 5.05 |
| Final pH | 4.75 | 4.82 | 4.86 | 4.97 | 4.95 |
| Percent phase separation | 71 | 60 | 41 | 28 | 26 |

EXAMPLE 2

This example illustrates the effect of adding a heat sensitive pH-increasing substance such as urea, and multivalent metal cations such as calcium to the sea water diluent utilized as a preflush and/or afterflush in obtaining the advantages of this invention.

Urea and calcium ions were added at 0.05 wt. % and 0.036 wt. % respectively to sea water. The thus additized sea water was used as diluent in place of the non-additized sea water in Example 1. The inhibitor composition used and conditions of study were the same as in Example 1. The results as shown in Table 3 indicate the beneficial effects of the additives in the diluent in increasing the phase separation level relative to a non-additized diluent as shown by the results in Table 2. After 24 hours at 100° C., the final pH and percent phase separation (at 62 to 67%) of the diluted samples were uniformly higher than those diluted with non-additized sea water.

TABLE 3

| Sample | 2A | 2B | 2C | 2D | 2E |
| --- | --- | --- | --- | --- | --- |
| Dilution ratio | 1 to 1 | 1 to 2 | 1 to 4 | 1 to 8 | 1 to 11 |
| Hours to initial haze | 2.5 | 3.25 | 3.92 | 3.92 | 3.42 |
| Final pH | 4.75 | 4.87 | 5.20 | 6.03 | 6.06 |
| Percent phase separation | 71 | 67 | 62 | 64 | 64 |

EXAMPLE 3

This example illustrates the effect of adding somewhat larger amounts of a heat sensitive pH-increasing substance such as urea, and calcium to the sea water diluent than were used in Example 2 in obtaining the advantages of this invention.

The procedure of Example 2 was followed except that urea and calcium ions were added in amounts of 0.20 wt. % and 0.152 wt. % respectively to the sea water diluent. The results as shown in Table 4 indicate the beneficial effects of the additives in the diluent in increasing the phase separation level relative to a non-additized diluent or a diluent containing lesser amounts of additives as shown in Tables 2 and 3 respectively. After 24 hours at 100° C., the final pH and percent phase separation (at 80 to 82%) of the diluted samples were uniformly higher than those diluted with a non-additized sea water or sea water containing lesser amounts of additives, with the phase separation reaching a level even higher than that achieved by the original undiluted inhibitor sample 3A (71%).

TABLE 4

| Sample | 3A | 3B | 3C | 3D | 3E |
| --- | --- | --- | --- | --- | --- |
| Dilution ratio | 1 to 1 | 1 to 2 | 1 to 4 | 1 to 8 | 1 to 11 |
| Hours to initial haze | 2.5 | 3.0 | 2.3 | 2.0 | 1.5 |
| Final pH | 4.75 | 5.8 | 7.0 | 7.8 | 8.0 |
| Percent phase separation | 71 | 82 | 81 | 80 | 80 |

EXAMPLE 4

This example further illustrates the effect of adding still larger amounts of a heat sensitive pH-increasing substance such as urea, and calcium to the sea water diluent than were used in Examples 2 and 3 in obtaining the advantages of this invention.

The procedure of Examples 2 and 3 was followed except that urea and calcium ions were added in amounts of 0.80 wt. % and 0.61 wt. % respectively to the sea water diluent. The results shown in Table 5 indicate the additional beneficial effects caused by increased amounts of the additive in the diluent in increasing the phase separation level as compared to a non-additized diluent shown by the results of Table 2 or a diluent containing lesser amounts of additives as shown by the results in Tables 3 and 4. After 24 hours at 100° C., the final pH and percent phase separation (at 90 to 95%) of the diluted samples were dramatically higher than those diluted with a non-additized sea water and were generally higher than obtained by dilution with sea water containing lesser amounts of additives, with phase separation much higher than that achieved by the original undiluted inhibitor sample 4A (71%).

TABLE 5

| Sample | 4A | 4B | 4C | 4D | 4E |
| --- | --- | --- | --- | --- | --- |
| Dilution ratio | 1 to 1 | 1 to 2 | 1 to 4 | 1 to 8 | 1 to 11 |
| Hours to initial haze | 2.5 | 1.6 | 0.9 | 0.6 | 0.6 |
| Final pH | 4.75 | 7.4 | 7.8 | 8.0 | 8.0 |
| Percent phase separation | 71 | 90 | 92 | 92 | 95 |

EXAMPLE 5

This example illustrates the effect of the inventive process on the deposition of inhibitor in the porous structure of berea sandstone cores, which simulates the structures of certain reservoir rock formations, and the subsequent slow release or desorption of the inhibitor from such cores.

Coreflood studies were conducted on two samples; one to which the original inhibitor composition in Example 1 was diluted to a 1 to 11 dilution ratio with an unadditized sea water, and the other diluted to a 1 to 11 dilution ratio with sea water containing 0.05 wt. % added urea and 0.036 wt. % of added calcium ions. Berea sandstone cores with permeability to nitrogen of 200 millidarcies and dimensions of 1"

diameter by 3" length, were presaturated with simulated field brine at 100° C. in a Hassler flow cell. The diluted inhibitor was passed through the core until the inlet and the outlet concentrations were equivalent to assure that adsorption requirements of the core have been satisfied. The core was shut-in for 24 hours prior to flowing back with the simulated field brine until the concentration of inhibitor fell below 2 ppm product. The number of pore volumes of brine passed up to this stage was assigned as the life of the treatment. The results showed that the sample diluted with additized sea water gave a significantly higher life of 746 pore volumes compared to 174 pore volumes from the sample diluted with unadditized sea water.

Examples 6 to 9 show that the addition of both a heat sensitive pH-increasing substance such as urea and multivalent metal cations such as calcium, to the sea water diluent utilized in a preflush and/or afterflush solution in practicing the invention exerts a synergistic effect in increasing the phase separation of the sparingly soluble multimetal salt of the scale inhibitor on the reservoir rock surfaces, i.e., the percent phase separation is greater than what would be expected from the additive effects of the heat sensitive pH-increasing substance and multivalent metal cations each utilized alone in the diluent solution.

EXAMPLE 6

Following the procedure of Example 1, an inhibitor solution was prepared containing 3.3 wt. % of PPA, 0.61 wt. % of calcium ions, and 1.6 wt. % of urea. The inhibitor solution without dilution, i.e., at a dilution ratio of 1 to 1 and an initial pH of 2.70, or such solution diluted with unadditized sea water to dilution ratios of 1 to 2.5 and 1 to 5, were subjected to 24 hours of aging at 90° C. The results as shown in Table 6 indicate that dilution with unadditized sea water causes a substantial decrease in percent phase separation, viz., from 64.9 at no dilution to 21.5 at a dilution ratio of 1 to 5.

TABLE 6

| Sample | 6A | 6B | 6C |
| --- | --- | --- | --- |
| Dilution ratio | 1 to 1 | 1 to 2.5 | 1 to 5 |
| Final pH | 4.82 | 4.75 | 4.76 |
| Percent phase separation | 64.9 | 38.1 | 21.5 |

EXAMPLE 7

The procedure of Example 6 was followed except that the sea water diluent contained 0.10 wt. % of calcium ions added as calcium chloride. The results shown in Table 7 indicate a decrease in percent phase separation resulting from dilution of from 64.9 at no dilution to 37.3 at a dilution ratio of 1 to 5. This was a significantly smaller decrease than was obtained when the diluent was unadditized sea water as shown in Table 6.

TABLE 7

| Sample | 7A | 7B | 7C |
| --- | --- | --- | --- |
| Dilution ratio | 1 to 1 | 1 to 2.5 | 1 to 5 |
| Final pH | 4.82 | 4.63 | 4.68 |
| Percent phase separation | 64.9 | 47.0 | 37.3 |

EXAMPLE 8

The procedure of Example 6 was repeated except that the sea water diluent contained 0.20 wt. % of urea and no added calcium ions. The results shown in Table 8 indicate a decrease in percent phase separation resulting from dilution of 64.9 at no dilution to 45.0 at a dilution ratio of 1 to 5.

TABLE 8

| Sample | 8A | 8B | 8C |
| --- | --- | --- | --- |
| Dilution ratio | 1 to 1 | 1 to 2.5 | 1 to 5 |
| Final pH | 4.82 | 5.33 | 6.11 |
| Percent phase separation | 64.9 | 47.2 | 45.0 |

EXAMPLE 9

The procedure of Example 6 was followed except that the sea water diluent contained both 0.10 wt. % of calcium ions and 0.20 wt. % of urea. The results as shown in Table 9 indicate that the percent phase separation increased from 64.9 at no dilution to 70.9 at a dilution ratio of 1 to 2.5 and 70.8 at a dilution ratio of 1 to 5.

TABLE 9

| Sample | 9A | 9B | 9C |
| --- | --- | --- | --- |
| Dilution ratio | 1 to 1 | 1 to 2.5 | 1 to 5 |
| Final pH | 4.82 | 5.48 | 6.18 |
| Percent phase separation | 64.9 | 70.9 | 70.8 |

The results of Examples 6 to 9 taken together indicate a synergistic effect in terms of percent phase separation when the dilution sea water contains both multivalent metal cations such as calcium and a heat sensitive pH-increasing substance such as urea, over the purely additive individual effects of the multivalent metal cations and heat sensitive pH-increasing substance obtained when each of these additives is utilized alone in the sea water diluent. Thus the difference between the percent phase separation resulting from dilution when the sea water diluent contained 0.10 wt. % of calcium ions as shown in Table 7 and that resulting from dilution with unadditized sea water as shown in Table 6 was +8.9 (47.0 minus 38.1) at a dilution ratio of 1 to 2.5 and +15.8 (37.3 minus 21.5) at a dilution ratio of 1 to 5; while the difference between the percent phase separation resulting from dilution when the sea water diluent contained 0.20 wt. % of urea as shown in Table 8 and that resulting from dilution with unadditized sea water as shown in Table 6 was +9.1 (47.2 minus 38.1) at a dilution ratio of 1 to 2.5 and +23.5 (45.0 minus 21.5) at a dilution ratio of 1 to 5. Thus, the difference between the percent phase separation resulting from dilution with sea water containing both 0 10 wt. % of calcium ions and 0.20 wt. % of urea and that resulting from dilution with unadditized sea water which could be predicted from the additive effect of the calcium ions and urea when each is utilized alone would be +18.0 (8.9 plus 9.1) at a dilution ratio of 1 to 2.5 and +39.3 (15.8 plus 23.5) at a dilution ratio of 1 to 5. In contrast, the actual difference between the percent phase separation resulting from dilution with sea water containing both 0.10 wt. % of calcium ions and 0.20 wt. % as shown in Table 9 and that resulting from dilution with unadditized sea water as shown in Table 6 was +32.8 (70.9 minus 38.1) at a dilution ratio of 1 to 2.5 and +49.3 (70.8 minus 21.5) at a dilution ratio of 1 to 5. The unexpected increase in percent phase separation resulting from dilution with both calcium ions and urea over that predicted from the additive effects of the calcium ions and urea when each was used alone is +14.8 (32.8 minus 18.0) at a dilution ratio of 1 to 2.5 and +10.0 (49.3 minus 39.3) at a dilution ratio of 1 to 5. The unexpected increase in percent phase separation expressed as a percentage of the predicted additive effect of the calcium ions and urea when each was used alone was 82.2% (14.8/18.0×100) at a dilution ratio of 1 to 2.5 and 25.4% (10.0/39.3×100) at a dilution ratio of 1 to 5. These results thus indicate a pronounced synergistic effect resulting from practice of the claimed invention.

I claim:

1. In a method for the inhibition of scale deposition on the surfaces of a well coproducing oil and scale forming brines comprising injecting into the well reservoir an acidic aqueous inhibitor solution at a first pH containing dissolved therein a scale inhibitor, multivalent metal cations in the form of a water-soluble salt in the presence of which said scale inhibitor is soluble at said first pH but with which it forms sparingly soluble salts at a higher pH, and a heat-sensitive pH-increasing substance which decomposes at elevated temperatures liberating an alkaline compound, such that the solution is inherently heated by the higher ambient reservoir temperature to a temperature at which the alkaline compound is liberated from the heat-sensitive substance thus raising the pH of the solution to said higher pH at which a sparingly soluble multivalent metal salt of the scale inhibitor is phase separated from the solution on the porous surfaces of the reservoir rock formation, providing for a slow release of inhibitor into the produced brines when the well is in its production phase, the improvement comprising injecting as a preflush before said injection of inhibitor solution and/or as an afterflush after said injection of inhibitor solution, a solution of a heat sensitive pH-increasing substance and multivalent metal cations which are members of the same categories of these substances as those in said inhibitor solution, the specific identities of said heat sensitive substance and multivalent metal cations in said preflush and/or afterflush solution being the same or different from such substances present in said inhibitor solution.

2. The method of claim 1 wherein said inhibitor is a polymeric polycarboxylate.

3. The method of claim 2 wherein said polycarboxylate is a polyacrylic acid.

4. The method of claim 3 wherein said polyacrylic acid is a phosphino-polyacrylic acid.

5. The method of claim 1 wherein said inhibitor is a phosphonate.

6. The method of claim 5 wherein said phosphonate is an aminomethylenephosphonate.

7. The method of claim 5 wherein said phosphonate is a polymeric phosphonate.

8. The method of claim 1 wherein said multivalent metal cations in said inhibitor solution, preflush solution and/or afterflush solution are alkaline earth, aluminum (+3), chromium (+3), iron (+3), titanium (+3), zirconium (+4), zinc (+2) or copper (+2).

9. The method of claim 8 wherein said multivalent metal cations are calcium.

10. The method of claim 8 wherein said multivalent metal cations are magnesium.

11. The method of claim 1 wherein said heat-sensitive substance in said inhibitor solution, preflush solution and/or afterflush solution is selected from the group consisting of urea; derivatives of urea having the formula $$R^1R^2NCONR^3R^4$$

wherein the R's are each hydrogen, an alkyl group containing 1 to 8 carbon atoms, or an aromatic group, and which contains no more than 10 carbon atoms; organic azides containing the group —N=N=N; cyanic acid; amines which have been previously sorbed into activated carbon or a similar sorption matrix; and tetraazatricycloalkanes.

12. The method of claim 11 wherein said heat-sensitive substance is a tetraazatricycloalkane.

13. The method of claim 11 wherein said heat-sensitive substance is urea or one of said derivatives of urea.

14. The method of claim 13 wherein said heat-sensitive substance is urea, 1-methylurea, 1,1-dimethylurea, 1,3-dimethylurea, 1,1,3-trimethylurea, 1-ethylurea, 1,1-diethylurea, 1,3-diethylurea, n-propylurea, n-butylurea, 1-phenylurea, 1-methyl-3-phenylurea or 1-ethyl-1-phenylurea.

15. The method of claim 14 wherein said heat-sensitive substance is urea.

16. The method of claim 1 wherein said inhibitor solution comprises about 0.25 to 15 wt. % of inhibitor based on the weight of the solution, about 0.05 to 5.0 equivalents of said multivalent metal ions per equivalent of inhibitor, and about 0.01 to 5.0 wt. % of said heat-sensitive substance based on the weight of the solution.

17. The method of claim 16 wherein said tetraazatricycloalkane is hexamethylenetetramine (HMTA).

18. The method of claim 16 wherein said preflush solution and/or afterflush solution comprises about 0.002 wt. % to 2.0 wt. % of said multivalent metal ions and about 0.002 to 5.0 wt. % of said heat sensitive pH-increasing substance.

19. The method of claim 17 wherein said heat-sensitive substance is an acyl azide.

20. The method of claim 19 wherein said acyl azide is acetyl azide, propionyl azide, malonyl azide, succinyl azide, or phthaloyl azide.

* * * * *